COLOR TELEVISION

Filed Sept. 14, 1954

2 Sheets-Sheet 1

INVENTORS
STUART W. SEELEY &
ALBERT MACOVSKI
BY
ATTORNEY

April 29, 1958 S. W. SEELEY ET AL 2,832,819

COLOR TELEVISION

Filed Sept. 14, 1954

2 Sheets-Sheet 2

INVENTORS
STUART W. SEELEY &
ALBERT MACOVSKI
BY [signature]
ATTORNEY

United States Patent Office 2,832,819
Patented Apr. 29, 1958

2,832,819

COLOR TELEVISION

Stuart W. Seeley, Roslyn Heights, and Albert Macovski, Massapequa, N. Y., assignors to Radio Corporation of America, a corporation of Delaware Application September 14, 1954, Serial No. 456,017

21 Claims. (Cl. 178—5.4)

The present invention relats to demodulating circuits, and more particularly to demodulating circuits of the type employed in color television receivers for producing a trio of color-difference signals from a chrominance signal.

Color images are transmitted in color television by use of standards which were authorized by the Federal Communications Commission on December 17, 1953. These standards describe a composite color television signal which contains both the luminance information relating the image and also a color modulated subcarrier or chrominance signal which contains color-difference signals each of which describe how the corresponding color in the televised scene differs from the color content of the corresponding color in the luminance signal; the color-difference signals which are contained in the color modulated subcarrier may be demodulated by the use of the processes of synchronous detection. It is, therefore, necessary in the color television receiver to provide a circuit which can be used to produce a desired trio of color-difference signals; the desired trio, when combined with the luminance signal, yields the recovered component color signals relating to the transmitted color image.

It is an object of this invention to provide an improved simplified demodulating circuit which demodulates two of a trio of color-difference signals producing a third color-difference signal having a commensurate amplitude level.

It is a further object of this invention to provide an improved demodulator circuit to which is applied the chrominance signal and also synchronous detection information having selected phases, and which produces red, blue and green color-difference signals at an amplitude level whereby these color-difference signals can be applied directly to a color image reproducer.

According to the invention, a demodulator comprising a grid controlled electron discharge device caused to conduct cyclically at a prescribed phase and capable of producing high level color-difference signal demodulation is provided for each of two color-difference signals. The chrominance signal is impressed across each electron discharge device. The pair of demodulator circuits are coupled to a common resistor network through which the cathode current of each of the demodulator circuits is caused to flow so that the demodulated color-difference signals produced by each demodulator is also caused to appear in reverse phase across the common resistor network to form a third color-difference signal. A trapping circuit is provided across the resistance network so that the signal information in the range of the frequencies of the chrominance signal will not be developed across the resistance network.

In one form of the invention, each of a pair of demodulator circuits consists of a class C device wherein the chrominance signal is applied to the plate circuit and the synchronous detection signal is applied between cathode and control grid in conjunction with a limiting circuit which causes class C operation; the first demodulator circuit produces synchronous detection at a phase lagging the color synchronizing burst phase by 102.95° and the second a phase lagging the color synchronizing burst by 166.53° The demodulated color-difference signals produced in the output circuits of the first and second demodulators are the red and blue color-difference signals respectively, with the green color-difference signal produced by signal addition of appropriate negative values of red and blue color-difference signal information in the resistance network.

Other and incidental objects of this invention will become apparent upon a reading of the following specification and an inspection of the accompanying drawings in which.

Figures 1, 2, 3, 4:
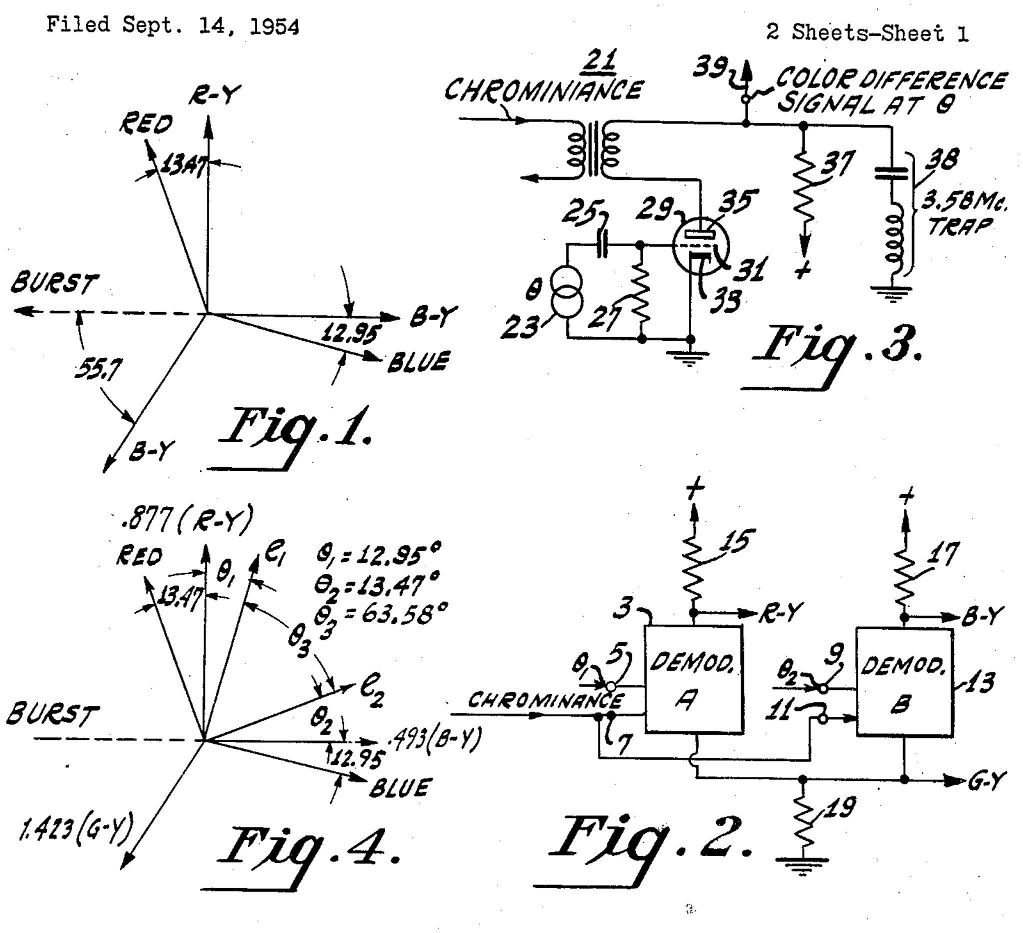
Figure 1 is a vector diagram relating the phase of the red, blue and green color-difference signals to the phase of the color synchronizing burst.
Figure 2 is a schematic diagram of a form of the demodulator circuit which operates according to the present invention.
Figure 3 is a block diagram of one form of the demodulator circuit of the present invention.
Figure 4 is a vector diagram relating the phase of the signals $e_1$ and $e_2$ to the vectors previously described in Figure 1.

The present invention is a simplified demodulating circuit which can accept a chrominance signal and yield a prescribed trio of color-difference signals at high level through the use of a minimum of circuitry.

Consider first the nature of the composite color television signal which conforms to the standards set by the Federal Communications Commission. Three primary colors, red, green and blue, are utilized for a description of the color contained in the image to be transmitted. These three primary colors do not appear equally bright because they are located in different parts of the spectrum and hence stimulate the brightness sensation by different amounts. However, if the three primary colors are mixed in the right proportions to form a Y signal according to the equation $$Y=.59G+.30R+.11B \qquad (1)$$

a luminance signal is produced; this luminance signal is generated in accordance with existing scanning standards and is treated exactly like a standard monochrome signal with respect to band-width and to the addition of synchronizing and blanking pulses.

In order to produce color images, it is necessary that the luminance signal be accompanied by information which describes the hue and saturation which is characteristic of the televised scene; it is therefore necessary to produce at least two independent color-difference signals since color involves three independent variables. If red and blue color-difference signals of the type designated as $R-Y$ and $B-Y$ are formed, it is possible to produce a green color-difference signal or $G-Y$ signal at the receiver by mixing the $R-Y$ and $B-Y$ signals according to the relationship $$G-Y=-.51(R-Y)-.19(B-Y) \qquad (2)$$

Color-difference signals are transmitted on a color modulated subcarrier or chrominance signal which contains not only the $R-Y$, $B-Y$ and $G-Y$ information, but also a continuous variety of hue as a function of phase angle. The demodulation of one or more of the color-difference signals then involves the utilization of the principles of synchronous detection wherein a locally generated signal in the receiver having the frequency of the modulated color subcarrier but having a particular phase relating to the particular color-difference signal being detected, is heterodyned with the modulated color subcarrier. If a multiplicity of color-difference signals are required, then a series of synchronous detectors, each using heterodyning signals of prescribed phase must be provided.

In order to make synchronous detection possible, synchronizing means are provided for synchronizing the phase of a local signal generator in a color television receiver. These synchronizing means are designed to utilize a color synchronizing burst which is transmitted on the back porch of the horizontal synchronizing pulse. This color synchronizing burst has the frequency of the color subcarrier and is phased with respect to the color-difference signals in a manner whereby, for example, the phase of the color synchronizing burst leads the phase of the $R-Y$ color-difference signal by 90° with the phase of the $R-Y$ color-difference signal leading the phases of the $B-Y$ color-difference signal and the $G-Y$ color-difference signal by 90° and 214.3° respectively.

In order to demodulate the $R-Y$, $G-Y$ and $B-Y$ color-difference signals from the chrominance signal a synchronous detector for each of these color-difference signals may be used. However, following from the concepts described by Equation 2 it is not necessary to demodulate more than two color-difference signals; if these two color-difference signals are $R-Y$ and $B-Y$ signals, then the third color-difference signal, namely the $G-Y$ signal is readily obtainable from suitable combination of the two demodulated color-difference signals. The teachings of the present invention are, therefore, devoted to the principles and concepts of a simplified demodulator and color-difference signal combining means which yields a trio of required color-difference signals from a chrominance signal in a manner involving not only new and novel concepts, but also a simplification of circuitry and a high amplitude level of the output signals.

There are three basic methods of applying chrominance information to a color kinescope. The demodulated color difference-signal information can be added to the luminance information, amplified, and then D.-C. restored at the kinescope grids. In another method, low level demodulators can be used, followed by D.-C. amplifiers which are D.-C. coupled to the kinescope grids. In still a third method, high level demodulators can be used which are directly D.-C. coupled to the kinescope grids. The third method is the simplest but it requires a demodulator having high output with good linearity and a high order of stability. The demodulator must be capable of providing a linear output approximately 50% greater than the maximum luminance drive. It must have good D.-C. stability with changes in its operating conditions, and a conversion efficiency which is relatively independent of the tube parameters. A demodulator meeting these requirements as does the one which is to be described in these specifications may be expected to provide more stable and reliable performance than the more complicated first methods.

Before entering upon a discussion of the present invention, consider first the vector diagram shown in Figure 1 wherein are related the phase of the color synchronizing burst to that of the $R-Y$, $B-Y$ and $G-Y$ color-difference signals which are contained in the chrominance signal. Included in Figure 1 are vectors relating to red and blue signal information, hereinafter called red and blue vectors, as included in the chrominance signal. It is seen that the red vector leads the $R-Y$ vector by 13.47° with the blue vector lagging the $B-Y$ vector by 12.95°. The full significance of the red and blue vectors as contained in the chrominance signal will be understood later in the specifications but it is significant to understand at this point that when the chrominance signal is transmitted in combination with the luminance signal and sharp pulse sampling of the entire composite signal is performed with the angles corresponding to red and blue as shown in Figure 1, then red and blue component color information will be obtained from the composite signal.

There is still another important aspect of the color-difference signal information which is contained in the chrominance signal; i. e. the amplitudes of the $R-Y$, $B-Y$ and $G-Y$ vectors contained in the chrominance signal are all different with the $R-Y$, $B-Y$ and $G-Y$ vector amplitudes related according to the ratios .877:.493:1.423.

Figure 2 shows a demodulator system in one of its more general forms. Demodulators of the type which can be utilized in the blocks 3 and 13 in Figure 2 are described, for example, in the paper entitled "Color Television Receiver Signal Demodulators," by D. H. Pritchard and R. N. Rhodes as published in the June 1953 issue of the RCA Review; a preferred demodulator circuit is shown in Figure 3.

It has been seen from Equation 2 that it is possible to produce a $G-Y$ signal by proper combination of appropriate values of $R-Y$ and $B-Y$ signal information. Consider the circuit shown in Figure 2, therefore, when, for example, a demodulator A bearing the designator 3 and a demodulator B bearing the designator 13 are employed. Each of the demodulators shown receives a chrominance signal and a properly phased synchronous demodulating signal. Demodulator A and demodulator B use a common network consisting of the resistor 19 when demodulator A is operated with demodulator B turned off, the color-difference signal corresponding to the phase of the synchronous demodulating signal applied to the input terminal 5 will appear in one polarity across the output resistor 15 and in reverse polarity across the resistor 19. In like fashion the color-difference signal produced by the demodulator B corresponding to the phase of the signal applied to the input terminal 9 will appear in one polarity across the output resistor 17 and in negative polarity across the resistor 19.

Consider the case where demodulator A is disconnected from the terminal 18 of the resistor 19 and whereby a chrominance signal is applied to the input terminal 11 of the demodulator B with a $B-Y$ phased synchronous demodulating signal applied to the input terminal 9. A $B-Y$ color-difference signal will then appear across the output resistor 17 and a $-(B-Y)$ signal will appear across the resistor 19.

If the demodulator A is then connected to the terminal 18 and if the demodulator A is adapted to produce an $R-Y$ signal in its output resistor 15 and a $-(R-Y)$ signal across the resistor 19, a $+(R-Y)$ signal will also be caused to appear across the output resistor 17 of demodulator B. It is desirable that values of both $-(R-Y)$ and $-(B-Y)$ color-difference signal information according to the proportions given in Equation 2 be produced across the resistor 19; however, it is important too that the color-difference signal produced, say in demodulator A, not be permitted to contaminate the color-difference signal produced in the output resistor 17 of demodulator B. This can be accomplished by an adjustment of synchronous detection phases whereby, for example, demodulator B, in order to produce a pure $B-Y$ color-difference signal across its output resistor 17, would also be caused to produce an $R-Y$ component in this output resistor having sufficient magnitude and suitable polarity to cancel any $R-Y$ signal information in the output resistor 17 introduced due to the action of the demodulator A driving the common resistor 19. If, for example, a $+(A-Y)$ signal is produced across output resistor 17 due to $R-Y$ signal demodulation in demodulator A, then the phase angle of the synchronous demodulating signal applied to terminal 9 should be suitable for generating both a $-(R-Y)$ signal and a $+B-Y$ signal across the output resistor 17. Likewise, it is desirable that signals appearing in the output resistor 15 of demodulator A, due to demodulator B, should also be cancelled by employing a suitable change in the phase angle of the synchronous demodulating signal in a direction which will introduce a $B-Y$ information-cancelling-signal of sufficient magnitude and suitable polarity.

An example of a preferred type of demodulator is shown in Figure 3; in this demodulator a chrominance signal is applied to a transformer 21 which applies the chrominance signal at correct amplitude level to the plate or anode 35 of the electron tube 29. At the same time a synchronous demodulating signal from a source 23 is applied through a grid limiting network made up of the condenser 25 and the resistor 27 which is connected between the grid 31 and the cathode 33. Because of the action of the grid limiting network, the tube 29 is then caused to operate in Class C amplifier fashion with the tube conduction cut off for substantial intervals of time dependent upon the precise phase of the synchronous demodulating signal yielded by the source 23. The tube 29 then is caused to present a nonlinear impedance to the chrominance signal which is presented between the anode 35 and cathode 33. Since the tube 29 is, essentially speaking, caused to conduct at prescribed intervals during each cycle of the synchronous demodulating wave produced at the source 23, the impedance as seen from the anode 35 to the cathode 33 may be expressed by a Fourier series whose fundamental frequency will be the frequency of the synchronous demodulating wave. This Fourier series will describe a series of terms describing the resistance as presented between the anode 35 and the cathode 33; consider now the case where a modulated color subcarrier constituting the chrominance signal is applied to the anode 35 at a time when for all practical purposes the impedance from the anode 35 to the cathode 33 of the tube 29 may be expressed by the term $R \cos \omega_c t$, the higher frequency terms which more completely describe the prescise resistance from anode to cathode will be neglected in this discussion since by proper adjustment of the values of the grid limiting network made up of the condenser 25 and the resistor 27, these higher frequencies of the Fourier series may be caused to be substantially smaller than the amplitude of the term of fundamental frequency.

The processes of demodulation is then explained by the following development. Let the modulated color subcarrier be expressed as $$i=A \cos \omega_c t+B \cos(\omega_c t+90°) \quad (3)$$

In order to recover the A component, let the signal $i$ be passed through the time varying resistance $R \cos \omega_c t$ in the synchronous detector to produce the voltage $$e=[RA \cos^2 \omega_c t+B \cos (\omega_c t+90°) \cos \omega_c t] \quad (4)$$

$$=R[\tfrac{1}{2}A+\tfrac{1}{2}A \cos 2\omega_c t+\tfrac{1}{2}B \cos 90°+ \tfrac{1}{2}B \cos (2\omega_c t+90°) \quad (5)$$

$$=\tfrac{1}{2}AR \quad (6)$$

since $\cos 90°=1$ and signals at frequency $2\omega_c$ may be easily filtered. Thus it is evident that because of the action of the time varying resistance, the A component has been recovered without attendant demodulation of the B component.

Synchronous detection at high level, therefore, is produced in a circuit of the type shown in Figure 3 with the color-difference signal corresponding to $\theta$ being produced across the output resistor 37 and, therefore, provided at the output terminal 39. In order to eliminate the frequency components in the neighborhood of the chrominance signal, a trap 38 is provided between the output terminal 39 to ground to provide a low impedance path for the signal components having frequencies in the chrominance signal frequency region thereby eliminating these higher frequency components from the output of the demodulator.

The circuit of Figure 3 may also be looked upon as a grid controlled rectifier. When no chrominance voltage is applied at the plate 35, the high peak plate currents bring the average plate voltage down to some low value which is relatively independent of the plate voltage applied. The circuit also adjusts the plate voltage during conduction to approximately the same value by virtue of its clamping action. Thus, if it is assumed that the instantaneous plate voltage during the conduction of the triode 29 is a fixed value, the demodulated voltage output will be equal to the peak-to-peak value of the chrominance signal as the relative phase of grid and plate signals goes from 0° to 180°. However, the plate voltage during conduction must change somewhat to change the average plate current. This is similar to the action of a diode peak rectifier wherein the plate-to-cathode voltage during conduction must change slightly with increasing signal amplitude. The amount of voltage change required to produce a given current change depends upon the perviance, and indicates the departure from 100% efficiency.

Figure 5:
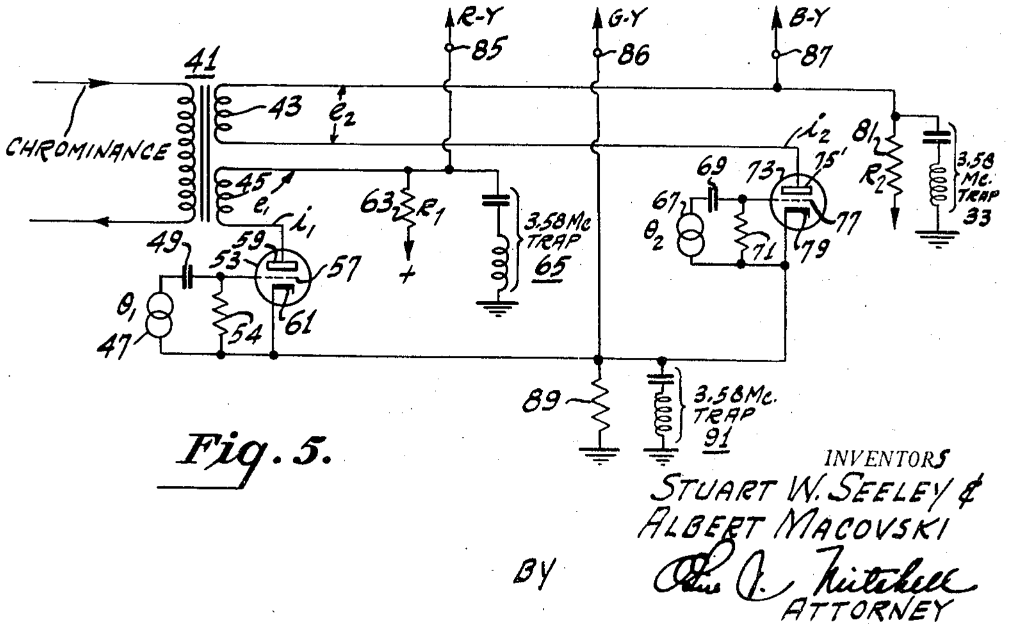
Figure 5 is a schematic diagram of a demodulator circuit which conforms to the teachings of the present invention.

One embodiment of the present invention based on the system shown in Figure 2 and utilizing the particular type of synchronous demodulator shown in Figure 3 is diagrammed in Figure 5. Here a synchronous demodulator utilizing the tube 53 is operated in conjunction with a synchronous demodulator utilizing the tube 73. The two synchronous demodulators have a common cathode 89 which serves as a boot-strap type connection resistor in that both the cathode currents $I_1$ and $I_2$ of the tubes 53 and 73 respectively pass through the resistor 89. Resistor 89 is denoted by the symbol $R_k$.

A chrominance signal voltage $e_1$ is applied to the anode 59 of tube 53 by way of the secondary coil 45 of transformer 41; transformer 41 also applies a signal $e_2$ from secondary coil 43 to the anode 75 of the tube 73. Synchronous demodulating signals having the phases $\theta_1$ and $\theta_2$ are provided by the source 47 and the source 67 respectively to the control grids 57 and 77 of the tubes 53 and 73. By proper choice of the phase angles $\theta_1$ and $\theta_2$, an $R-Y$ signal will then be provided at the output terminal 85 of the synchronous demodulator employing the tube 53, and the $B-Y$ color-difference signal will be provided at the output terminal 87 of the synchronous demodulator employing the tube 73. The color-difference signals produced across the resistor 89 by either of the synchronous demodulators are of negative polarity with respect to the color-difference signals produced at the output circuits of the demodulators; also the resistor 89 serves as a coupling mechanism whereby the color-difference signal yielded by the synchronous demodulator employing the tube 53 is caused to drive the synchronous demodulator utilizing the tube 73 and vice-versa. By adjusting the circuit parameters of the circuit shown in Figure 5 for the case where a negative amount of $G-Y$ signal is added to a negative amount of $R-Y$ signal according to the relationship shown in Figure 2, a $G-Y$ color-difference signal is produced at the output terminal 86. The precise angles, $\theta_1$ and $\theta_2$ which must be employed to provide a pure $B-Y$ color-difference signal at the output terminal 87 and a pure $R-Y$ color-difference signal at the output terminal 85 are derived in the following discussion, which is based on the circuit shown in Figure 5.

If a substantially zero voltage drop is assumed in tubes 53 and 73, then the following equations describe the current flowing through the resistor $R_k$ bearing the designator 89 and the resistors $R_1$ and $R_2$ bearing the designators 81 and 63 respectively:

$$(i_1+i_2)R_k=G-Y \quad (7)$$

$$(i_1 E i_2)R_k=-.51(R-Y)-.19(B-Y) \quad (8)$$

$$i_1R_1=R-Y \quad (9)$$

$$i_2R_2=B-Y \quad (10)$$

Let $R-Y=0$; then $$i_2R_2=B-Y \quad (11)$$

$$i_2R_k=.19(B-Y) \quad (12)$$

from which it follows that $$\frac{R_2}{R_k}=\frac{1}{.19}=5.23 \quad (13)$$

Let $B-Y=0$; then $$i_1R_1=R-Y \quad (14)$$

$$i_1R_k=.51R-Y \quad (15)$$

or $$\frac{R_1}{R_k}=1.96 \quad (16)$$

$$R_2/R_1/R_k=5.23/1.96/1 \quad (17)$$

Assuming a demodulation efficiency of 100%, it then follows that the voltage $e_1$ and $e_2$ provided by the transformer 41 may be expressed as $$e_1=G-Y-(R-Y) \quad (18)$$

$$=-1.51(R-Y)-.19(B-Y) \quad (19)$$

Utilizing the differences in amplitude of $R-Y$ and $B-Y$ included in Figure 4, $e_1$ becomes $$e_1=-1.51\times1.14\left(\frac{R-Y}{1.14}\right)-.19\times2.03\left(\frac{B-Y}{2.03}\right) \quad (20)$$

$$=-1.72\frac{R-Y}{1.14}-.39\frac{B-Y}{2.03} \quad (21)$$

or $$\tan\theta_1=\frac{.39}{1.72}=.226 \quad (22)$$

$$\theta=12.95 \quad (23)$$

and $$e_2=G-Y-(B-Y) \quad (24)$$

$$=.51(R-Y)-1.19(B-Y) \quad (25)$$

$$=.51\times1.14\left(\frac{R-Y}{1.14}\right)-1.19\times2.03\left(\frac{B-Y}{2.03}\right) \quad (26)$$

$$=.582\left(\frac{R-Y}{1.14}\right)-2.42\left(\frac{B-Y}{2.03}\right) \quad (27)$$

or $$\tan\theta_2=\frac{.582}{2.42}=.24 \quad (28)$$

$$\theta_2=13.47 \quad (29)$$

The angle $\theta_3$, between $e_1$ and $e_2$ is then found to be $$\theta_3=90°-\theta_1-\theta_2 \quad (30)$$

$$=63.58° \quad (31)$$

and since $$e_1\cos\theta_1=1.72 \quad (32)$$

then $$e_2\sin\theta_2=.582 \quad (33)$$

$$\frac{e_1}{e_2}=\frac{1.72\sin 13.47°}{.582\cos 12.95°}=\frac{2.46}{1.77}=1.41 \quad (34)$$

In the circuit shown in Figure 4, it is important that the chrominance signal be eliminated from the various output terminals at which are developed the color-difference signal information. By utilizing the traps 65, 91 and 33 which are coupled from the output terminals 85, 86 and 87 to ground, the signal information in the vicinity of the frequency of the color subcarrier is then trapped to ground and is not permitted to contaminate the color-difference signals which are produced by the circuit or to provide moire effects or rectification in a color image reproducer which is utilized in conjunction with the demodulator circuit.

An interesting aspect of the nature of the 63.58° angle which exists between the synchronous demodulating signals which are applied to the respective synchronous demodulators is the fact that the angle of the synchronous demodulator signal applied to the control grid 57 is in quadrature with the angle of the pure blue signal and the angle of the synchronous demodulator signal applied to the control grid 77 is in quadrature with the angle of the pure red signal. Thus, upon transmission of a blue bar, there is no current change in the tube 53 and vice-versa.

Figure 6:
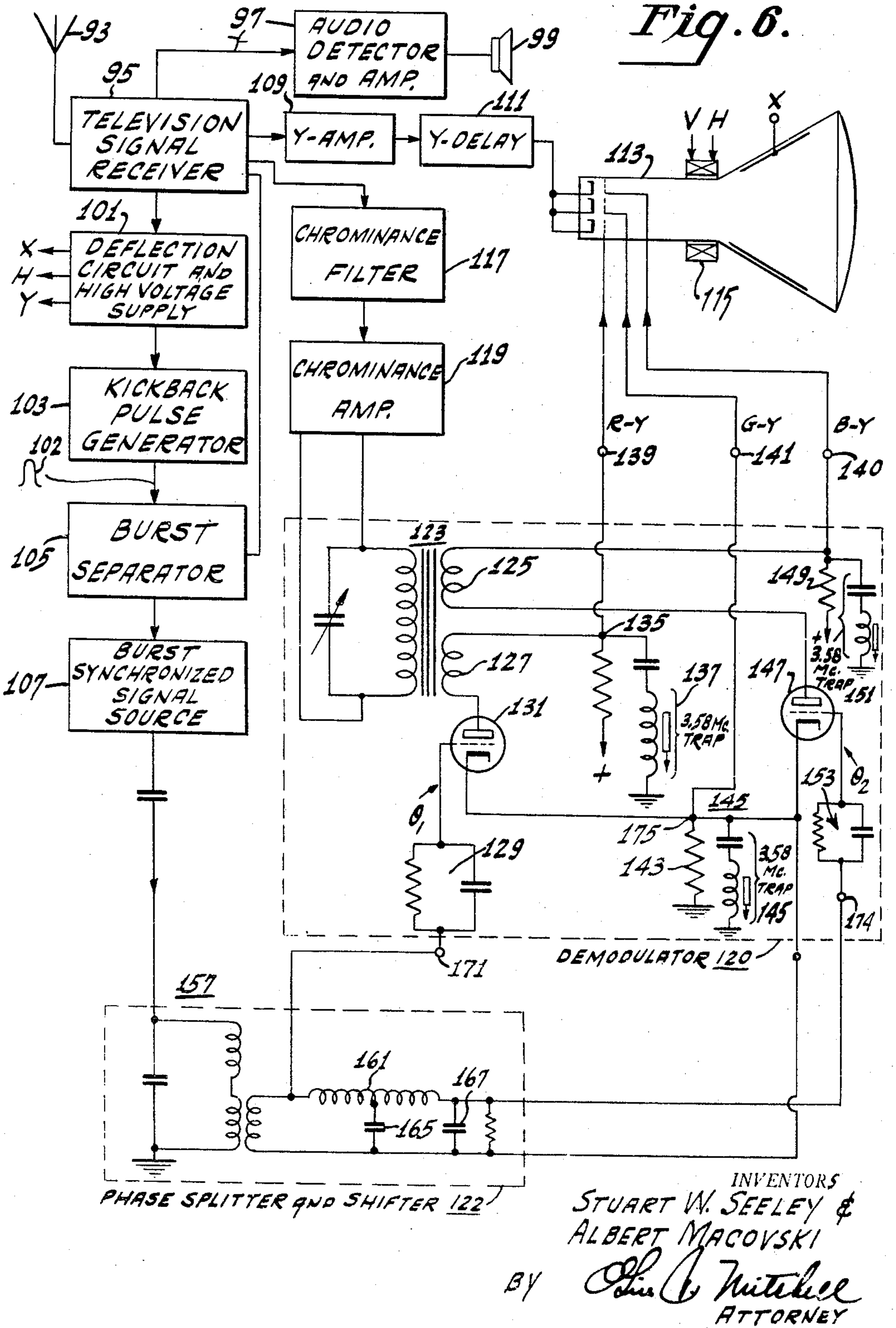
Figure 6 is a diagram of a color television receiver which includes a schematic diagram of a demodulator and a phase splitter and shifter which illustrates another embodiment of the present invention.

Consider now the circuit shown in Figure 6 which represents a color television receiver which utilizes a form of demodulator circuit following closely from the design of the demodulator circuit shown in Figure 5. The incoming color television signal which is transmitted on a video carrier, reaches the antenna 93 and is applied to the television signal receiver 95. Utilizing such well-known functions as first detection, intermediate frequency amplification and second detection, the television signal receiver 95 provides a demodulated composite color television signal and also includes a sound modulated carrier which is transmitted 4½ mcs. removed from the video carrier.

Utilizing, for example, an intercarrier sound circuit, the audio information may be separated from the video information and amplified to a desired level in the audio detector and amplifier 97. The amplified audio signal is then applied to the loud speaker 99.

The television signal receiver 95 furnishes the deflection synchronizing signals to the deflection circuits and high voltage supply 101 which provide deflection signals to the yokes 115 of the color image reproducer 113; in addition excitation is provided for the kickback pulse generator 103 which produces kickback pulses 102, each having a duration time substantially the duration interval of the color synchronizing bursts. The kickback pulses 102 are applied to the burst separator 105 to which is also supplied the composite color television signal from the television signal receiver 95. By utilizing a suitable gate circuit activated by the kickback pulses 102 in the burst separator 105, the color synchronizing burst is separated from the color television signal and applied to the burst synchronized signal source 107. The burst synchronized signal source produces an output signal having the frequency of the color subcarrier and having a phase accurately synchronized in accordance with the phase prescribed by the color synchronizing burst.

The color television signal, which in its composite form contains luminance or Y signal information, is passed through the Y amplifier 109 where it is amplified to a predetermined level. The resultant amplified Y signal is passed through the Y delay 111 and applied to the cathodes of the color image reproducer 113. Since it is desired that the Y signal which is applied to the cathode, be added to the color-difference signals of the type *R—Y*, *B—Y* and *G—Y*, the color-difference signals which are provided by the demodulator 120 are applied to appropriate control grids of the color image reproducer 113 so that signal addition is accurately produced within the color image reproducer thereby eliminating the necessity of using auxiliary adder circuits.

The color television signal as provided by the color television signal receiver 95 is also applied to the chrominance filter 117. The chrominance filter 117, therefore, performs the function of filtering the color television signal to provide a desired frequency range of the chrominance signal in its output.

The chrominance signal is applied to the amplifier 119 which raises the amplitude level of the chrominance signal to a predetermined amplitude level and applies this amplified chrominance signal to the transformer 123 which is the input device of the demodulator 120. The circuit which illustrates the demodulator 120 in Figure 6 functions according to the principles previously described in connection with the circuit diagram shown in Figure 5. A pair of triodes, 131 and 147 respectively, are utilized. The transformer secondary 127 applies a chrominance signal to the anode of the tube 131 and the transformer secondary 125 applies the chrominance signal to the anode of the tube 147. The cathodes of the tubes 131 and 147 are coupled to a common cathode terminal 175, from which terminal the common cathode resistor 143 is connected to ground; this common cathode resistor 143, following from the discussion relating to the circuit shown in Figure 5, then acts as a means for adding the currents which flow through the tubes 131 and 147 in addition to providing a mutual driving mechanism between the synchronous demodulators utilizing the tubes 131 and 147, respectively. A bias network 129 is coupled to the control grid of the tube 131. The bias network 153 is coupled to the control grid of the tube 147. A phase splitter and shifter 122 receives a burst synchronized signal from the burst synchronized signal source 107, and utilizing a simulated transmission line made up of the filter network comprising the series inductance arm 161 and the shunt capacitors 165 and 167 with the terminating resistor 169, presents a signal having the phase $\theta_1$ at the terminal 171 from which terminal this signal is developed between the control grid of the tube 131 and the cathode terminal 175; in like fashion a synchronous demodulating signal having the phase $\theta_2$ is provided between the cathode terminal 175 and the terminal 173 which is coupled to the control grid of tube 147 by way of the bias network 153.

The demodulator 120 is then caused to develop *R—Y* and *B—Y* signals at the output terminals 139 and 140 respectively, with a *G—Y* signal produced at the output terminal 141 which is connected to the cathode terminal 175.

In order that the chrominance signal be eliminated from the output terminals 139, 140 and 141 the traps 137, 151 and 145 are employed. These traps are series resonant circuits which are designed to present very low impedance to signals having frequencies in the vicinity of the color subcarrier and the chrominance signal. The trap 145 has the additional function of referring the cathode terminal 175 which is the high potential terminal of the common cathode resistor 143 to substantially ground potential for signals having a frequency in the vicinity of the frequency of the chrominance signal.

In the present invention, the demodulated outputs are D. C. coupled to the control grids of the color image reproducer 113. In this arrangement, any change in the plate-to-cathode voltage of the component demodulators of the demodulator 120 would appear as differential brightness voltage between the electron guns of the color image reproducer 113. No such differential variations will exist and the system will be stable if the plate-to-cathode voltage remains constant with incidental changes in grid drive and if the tubes have sufficient current capability to act as efficient switches. This situation is aided by the class C nature of the demodulator 120. Thus, as the grid drive increases, the peak currents rise and the conduction angle goes down tending to maintain relatively constant average current. Almost all triodes used in experimental forms of this circuit showed relatively constant plate voltage within the range of grid drive used. Some even displayed relatively constant plate voltage to very small value of grid drive voltage.

To assure that the demodulating components at all frequencies are distributed according to the load resistor ratios, the time constants must be made equal. A simple method of accomplishing this is to use minimum capacitance in the trap 145 and to increase the capacitance of traps 137 and 151.

The triodes 131 and 147 in the demodulator 120 operate best when they conduct at that part of the characteristics where the plate voltage versus plate current curve is steepest. Also, for each value of supply voltage, there is an optimum value of load resistor to obtain the most desirable operating point; however this optimum value is not a critical value. The plate voltage during conduction is adjusted to be only about 25 volts and the conduction is primarily determined by the grid current conduction angle thereby being almost independent of $\mu$; when the grid voltage goes slightly below zero bias, the tube cuts off. The conduction angle is then determined by the grid drive, the plate impedance and the bias networks 129 and 153. As the losses of the bias networks 129 and 153 is decreased and the conduction angle increases, the linear output range is reduced. In other words, when conducting over a wide angle, the demodulator 120 becomes somewhat dependent on the linearity of the plate voltage versus plate current characteristics. When the losses of the bias networks 129 and 153 is increased, the conduction angle becomes small but the peak current is reduced to a point whereby poor frequency response results. Using demodulator tubes of the type 12B87, a 300 ohm driving source, and a grid resistor of 3.3K, the linearity will be excellent and the frequency response will be limited only by the pass band of the chrominance amplifiers preceding the demodulator.

Since the component demodulators in the demodulator 120 are efficient peak detectors, their output voltage being dependent on the chrominance signal input and not on any tube characteristics as such, no differential controls are needed to adjust for the various gains for *R—Y*, *B—Y* and *G—Y*. A transformer 123 is used whose secondary windings are tightly coupled to the primary, and whose turns ratios are in the proper ratio of the desired demodulated output voltages. Since the transformer ratios cannot drift, and the demodulated output is somewhat independent of tube characteristics, color fidelity is assured without the necessity of using any differential controls.

Having described the invention, what is claimed is:

1. In combination, a synchronous demodulator circuit comprising, a source of modulated carrier capable of being demodulated at different phases to produce different information, a first amplifier circuit and a second amplifier circuit each having an anode, a cathode and at least a control grid and an anode output circuit, means to impress said phase modulated carrier between anode and cathode of both said first and second amplifier circuits, said first amplifier circuit including a grid excitation source coupled to said control grid to operate said first amplifier circuit class C corresponding to a first prescribed phase and frequency, said second amplifier circuit including a grid excitation source coupled to said control grid to operate said second amplifier circuit class C at said prescribed frequency and at a second prescribed phase, a circuit means coupled to the cathodes of said first amplifier circuit and said second amplifier circuit to form a mutual cathode output circuit to produce a prescribed addition of demodulated signals of prescribed polarity to obtain a signal representative of a combination of information occurring at said first and second phases in said modulated carrier as developed by both said first amplifier circuit and said second amplifier circuit in said mutual cathode output circuit.

2. In combination: first and second synchronous demodulator means each operative to demodulate in a frequency range and each including an electron discharge device having a cathode type electrode, a fixed potential terminal, an impedance means coupled from both of said cathode type electrodes to said fixed potential terminal, and a series resonant circuit having a prescribed series resonant frequency connected in shunt with said impedance means to operate as a trap in said frequency range.

3. In combinatoin: a first and second electron tube demodulator means each including a pulrality of electrodes including a cathode and an anode and a control electrode, a fixed potential terminal, means to apply a chrominance signal and a demodulating signal of predetermined phase and both occurring in a frequency range to prescribed ones of the plurality of electrodes of each of said electron tube demodulator means, an impedance means coupled from both of said cathodes to said fixed potential terminal, and a series resonant circuit have a prescribed series resonant frequency connected in shunt with said impedance means to operate as a trap in the frequency range of said chrominance signal and said demodulating signal.

4. In combination, a source of a phase modulated carrier, a first amplifier circuit and a second amplifier circuit each having an anode, a cathode and at least a control grid and an anode output circuit, means to impress said phase modulated carrier between the anode and cathode of both said first and second amplifier circuits, said first amplifier circuit including a grid excitation source coupled to the control grid of said first amplifier circuit to operate said first circuit class C corresponding to a first prescribed phase and frequency, said second amplifier circuit including a grid excitation source coupled to said control grid to operate said second circuit class C at said prescribed frequency and at a second prescribed phase, means coupled to the cathodes of said first amplifier circuit and said second output amplifier circuit to form a mutual cathode output circuit to produce a prescribed addition of amplifier currents as provided by both said first amplifier circuit and said second amplifier circuit in said mutual cathode output circuit, a filter network having at least a series resonance in a predetermined frequency range, and means for coupling said filter network substantially in shunt with said mutual cathode output circuit.

5. In combination, a first synchronous detector circuit and a second synchronous detector circuit each including an electron control device having at least an anode, a cathode, and a control electrode, an output circuit coupled to said anode and an anode input circuit coupled to said anode, an incoming signal source, said incoming signal source containing information susceptible to demodulation by the processes of synchronous detection at various phases relative to a reference phase, means for coupling said incoming signal source to said anode input circuits of both said first synchronous detector and said second synchronous detector to impress said incoming signal between the anodes and cathodes of both of said electron control devices, an output impedance, a reference potential terminal, means for coupling said output impedance between both of the cathodes of both of said electron control devices and said reference potential terminal to form a common cathode output circuit, a first synchronous detection signal source having a predetermined frequency and phase and coupled between the grid and cathode of the electron control device of said first synchronous detector to operate said electron control device as a class C amplifier, a second synchronous detector signal source having a second prescribed phase and coupled between the cathode and control electrode of the electron control device of said second synchronous detector to cause said electron control device to operate class C.

6. In combination, a first synchronous detector circuit and a second synchronous detector circuit each including an electron control device having at least an anode, a cathode, and a control electrode, an output circuit coupled to said anode and an anode input circuit coupled to said anode, an incoming signal source, said incoming signal source containing information susceptible to demodulation by the processes of synchronous detection at various phases relative to a reference phase, means for coupling said incoming signal source to said anode input circuits of both said first synchronous detector and said second synchronous detector whereby said incoming signal is impressed between the anode and cathode of both of said electron control devices, an output impedance, a reference potential terminal, means for coupling said output impedance between both of the cathodes of both of said electron control devices and said reference potential terminal to form a common cathode output circuit, a first synchronous detection signal source having a predetermined frequency and phase and coupled between the grid and cathode of the electron control device of said first synchronous detector to operate said electron control device as a class C amplifier, a second synchronous detector signal source having a second prescribed phase and coupled between the cathode and control electrode of the electron control device of said second synchronous detector to cause said electron control device to operate class C, a first, second, and third filter circuits, said first, second, and third filter circuits exhibiting a series resonance in a predetermined frequency range corresponding to the frequency provided by said first and second synchronous detection signal source, and means for coupling said first filter circuit between the output circuit of said first synchronous detector and said reference potential terminal, means for coupling said second filtering circuit between the output circuit of said second synchronous detector and said reference signal terminal, and means for coupling said third filter network substantially in shunt with said output impedance circuit.

7. In a color television receiver adapted to receive a color television signal including a chrominance signal including color-difference signals which are susceptible to the processes of synchronous demodulation at phases which are related to a reference phase, and a color synchronizing burst containing reference wave information, said color-difference signals characterized in that at least a first of said color-difference signals may be formed by combination of prescribed quantities of a second and a third color-difference signal, a color synchronous demodulation circuit for producing said first, second and third color-difference signals from said chrominance signal comprising in combination, a first synhcronous demodulator circuit and a second synchronous demodulator circuit, each having a grid controlled electron tube connected to function as class C amplifiers and have an input circuit connected to develop a signal applied thereto across said electron tube and having an output circuit, and a bias-and-driving circuit for producing the class C amplifier action, means for coupling said chrominance signal to the input circuits of both said first and said second synchronous demodulator circuits, a synchronous demodulating signal source, said synchronous demodulating signal source including means whereby the signals produced by said synchronous demodulating signal source are phase synchronized to the phase prescribed by said color-synchronizing burst and whereby phase shifting and splitting means are provided to provide a synchronously demodulating signal of a first predetermined phase to the bias-and-driving circuit of said first synchronous demodulator circuit and a synchronous demodulating signal of a second predetermined phase to the bias-and-driving circuit of said second synchronous demodulator circuit, a common output circuit, said common output circuit coupled to both said first synchronous demodulator and said second synchronous demodulator and operatively connected whereby any synchronously demodulated signals produced in the output circuits of either said first synchronous demodulator circuit or said second synchronous demodulator circuit is produced in said common output circuit in reversed polarity relative to the polarity of the corresponding signal produced in the output circuit of that synchronous demodulator, and whereby said common output circuit also serves as a means whereby the synchronously demodulated signal produced by one of said first and second synchronous demodulator circuits may be utilized to drive the other of the two synchronous demodulator circuits, the coupling between said common output circuit to said first synchronous demodulator circuit and said second synchronous demodulator circuit proportioned whereby in accordance with said class C amplifier action synchronous demodulation is produced in said first synchronous demodulator circuit and said second synchronous demodulator circuit to produce said first color-difference signal in said common output circuit, said second color-difference signal in the output circuit of said first synchronous demodulator circuit and said third color-difference signal in the output circuit of said second synchronous demodulator circuit.

8. In a color television receiver adapted to receive a color television signal including a chrominance signal including color-difference signals which are susceptible to the processes of synchronous demodulation at phases which are related to a reference phase, and a color synchronizing burst containing reference wave information, said color-difference signals characterized in that at least a first of said color-difference signals may be formed by combination of prescribed quantities of a second and a third color-difference signal, a color synchronous demodulation circuit for producing said first, second and third color-difference signals from said chrominance signal comprising in combination, a first synchronous demodulator circuit and a second synchronous demodulator circuit, each characterized in that they function as class C amplifiers and have an electron control device having at least an anode and a control electrode and having an input circuit coupled to said anode, an output circuit, and a control electrode bias-and-driving circuit for producing the class C amplifier action, means for coupling said chrominance signal to the anodes and across the electron control devices in both of said first and said second synchronous demodulator circuits, a synchronous demodulating signal source including means whereby the signals produced by said synchronous demodulating signal source are phase synchronized to the phase prescribed by said color-synchronizing burst and wherein phase shifting and splitting means are provided to provide a synchronously demodulating signal of a first predetermined phase to the control electrode bias-and-driving circuit of said first synchronous demodulator circuit and a synchronous demodulating signal of a second predetermined phase to the control electrode bias-and-driving circuit of said second synchronous demodulator circuit, a common output circuit coupled to the output circuit of both said first synchronous demodulator and said second synchronous demodulator and characterized in that any synchronously demodulated signals produced in the output circuits of either said first synchronous demodulator circuit or said second synchronous demodulator circuit are produced in said common output circuit in reversed polarity relative to the polarity of the corresponding signal produced in the output circuit of that synchronous demodulator, and whereby said common output circuit also serves as a means whereby the synchronously demodulated signal produced by one of said first and second synchronous demodulator circuits may be utilized to drive the other of the two synchronous demodulator circuits, the coupling between said common output circuit to said first synchronous demodulator circuit and said second synchronous demodulator circuit proportioned whereby in accordance with said class C amplifier action synchronous demodulation is produced in said first synchronous demodulator circuit and said second synchronous demodulator circuit to produce said first color-difference signal in said common output circuit, said second color-difference signal in the output circuit of said first synchronous demodulator circuit and said third color-difference signal in the output circuit of said second synchronous demodulator circuit, a filter network, said filter network characterized in that it displays series resonance at substantially the frequency of said color synchronized burst and means for coupling said filter network across said common output circuit.

9. In a color television receiver adapted to receive a color television signal including a chrominance signal including color-difference signals which are susceptible to the processes of synchronous demodulation at phases which are related to a reference phase, and a color synchronizing burst containing reference phase information, at least a first of said color-difference signals contained in said chrominance signal susceptible to recovery by the signal addition of predetermined amounts of a second and a third color-difference signal, a synchronous-demodulation circuit, comprising in combination, a color-synchronizing-burst-responsive signal source having a phase prescribed by said color burst, a phase shifting and splitting device adapted to provide at least a first synchronous demodulation signal having a first predetermined phase and a second synchronous demodulation signal having a second predetermined phase, a first amplifier device and a second amplifier device, each having at least an anode, an anode output circuit, a control electrode, a cathode, and a control electrode circuit, means for coupling said chrominance signal to said first and second amplifier devices to apply a chrominance signal of a first prescribed amplitude at the anode of said first amplifier device and a second prescribed amplitude at the anode of said second amplifier device, means for coupling said first synchronous demodulating signal to the control electrode circuit of said first amplifier device and means for coupling said second synchronous demodulating signal to the control electrode circuit of said second amplifier device whereby both said first amplifier device and said second amplifier device are caused to synchronously detect at the phases of the synchronous demodulating signals applied thereto, a cathode impedance network, a fixed potential terminal, means coupling said cathode impedance network between said fixed potential terminal and both of the cathodes of said first amplifier device and said second amplifier device whereby said cathode impedance network is caused to function as a common cathode coupling impedance and whereby any synchronously demodulated signal produced in the anode output circuits of either said first or said second amplifier devices is caused to be produced in reverse polarity across said cathode impedance network, and said first amplifier device and said second amplifier device caused to amplify whereby said first color-difference signal is produced across said cathode impedance network, said second color-difference signal is produced in the anode output circuit of said first amplifier device and said third color-difference signal is produced in the anode output circuit of said second amplifier device, a first, second and third filter network, each of said first, second and third filter networks characterized in that it displays series resonance in a prescribed region of frequencies of said chrominance signal, a fixed potential terminal, means for coupling said first filter network between said cathodes of said first amplifier device and said second amplifier device and said fixed potential terminal, means for coupling said second filter network between the anode output circuit of said first amplifier device and said fixed potential terminal, and means for coupling said third filter network between the anode output circuit of said second amplifier device and said fixed potential terminal.

10. In a color television receiver adapted to receive a color television signal including a chrominance signal including color-difference signals which are susceptible to the processes of synchronous detection at phases which are related to a reference phase, said color-difference signals including $R-Y$, $B-Y$, and $G-Y$ signals and having prescribed phase relationships with respect to said reference phase, said $G-Y$ signal characterized in that it may be also formed by signal addition of predetermined color-difference signals other than said $R-Y$, and $B-Y$ color-difference signals, and a color synchronizing burst containing reference phase information, a synchronous demodulation circuit, comprising in combination, a color-synchronizing - burst - responsive synchronous - detection-signal source having an output signal at a phase synchronized with respect to a phase prescribed by said color-synchronizing burst, a phase shifting and splitting device coupled to said color synchronizing burst responsive signal source and adapted to produce at least a first synchronous demodulating signal having a phase which lags the phase of said color synchronizing burst by substantially 102.95° and providing a second synchronous demodulating signal having a reference phase which lags the phase of said color synchronizing burst by substantially 166.53°, a first synchronous demodulating circuit and a second synchronous demodulating circuit each including at least an electron control device having at least an anode, a cathode and a control electrode, an anode output circuit, and a control electrode bias-and-driving circuit, means for coupling said chrominance signal to said electron control devices of said first and second synchronous demodulating circuits to provide said chrominance signal at a first amplitude level at the anode of said first synchronous demodulating circuit and at a second prescribed amplitude at the anode of said second synchronous demodulating circuit, means for coupling said first synchronous demodulating signal to the control electrode bias-and-driving circuit of said first synchronous demodulator and means for coupling said second synchronous demodulating signal to the control electrode bias-and-driving circuit of said second synchronous demodulator circuit, a cathode resistor circuit, a fixed potential terminal, means for coupling said cathode resistor circuit between said fixed potential terminal and both of said cathodes of said electron control devices of said first synchronous demodulator and said second synchronous demodulator, the control electrode biasing and driving circuits in said first synchronous demodulator circuit and said second synchronous demodulator circuit having time constants whereby said first electron control device and said second electron control device are caused to function as class C amplifiers and whereby said $G—Y$ signal is produced across said common cathode resistor, said $R—Y$ signal is caused to be produced across the output circuit of said first synchronous demodulator circuit and said $B—Y$ signal is caused to be produced across the output circuit of said synchronous demodulator circuit.

11. In a color television receiver adapted to receive a color television signal including a chrominance signal including color-difference signals which are susceptible to the processes of synchronous detection at phases which are related to a reference phase, said color-difference signals including $R—Y$, $B—Y$, and $G—Y$ signals and having prescribed phase relationships with respect to said reference phase, said $G—Y$ signal characterized in that it may be also formed by signal addition of predetermined color-difference signals other than said $R—Y$ and $B—Y$ color-difference signals, and a color synchronizing burst containing reference phase information, a synchronous demodulation circuit, comprising in combination, a color-synchronizing - burst - responsive synchronous - detection-signal source having an output signal at a phase synchronized with respect to a phase prescribed by said color-synchronizing burst, a phase shifting and splitting device coupled to said color synchronizing burst responsive signal source and adapted to produce at least a first synchronous demodulating signal having a phase which lags the phase of said color synchronizing burst by substantially 102.95° and providing a second synchronous demodulating signal having a reference phase which lags the phase of said color synchronizing burst by substantially 166.53°, a first synchronous demodulating circuit and a second synchronous demodulating circuit each including at least an electron control device having at least an anode, a cathode and a control electrode, an anode output circuit, and a control electrode bias-and-driving circuit, means for coupling said chrominance signal to electrodes including the anodes of said first and second synchronous demodulating circuits to provide said chrominance signal at a first amplitude level at the anode of said first synchronous demodulating circuit and at a second prescribed amplitude at the anode of said second synchronous demodulating circuit, means for coupling said first synchronous demodulating signal to the control electrode bias-and-driving circuit of said first synchronous demodulator and means for coupling said second synchronous demodulating signal to the control electrode bias-and-driving circuit of said second synchronous demodulator circuit, a cathode resistor circuit, a fixed potential terminal, means for coupling said cathode resistor circuit between said fixed potential terminal and both of said cathodes of said electron control devices of said first synchronous demodulator and said second synchronous demodulator, the control electrode biasing and driving circuits in said first synchronous demodulator circuit and said second synchronous demodulator circuit having time constants whereby said first electron control device and said second electron control device are caused to function as grid controlled rectifiers to produce synchronous demodulation and whereby said $G—Y$ signal is produced across said common cathode resistor, said $R—Y$ signal is caused to be produced across the output circuit of said first synchronous demodulator circuit and said $B—Y$ signal is caused to be produced across the output circuit of said synchronous demodulator circuit.

12. In a color television receiver adapted to receive a color television signal including a chrominance signal including color-difference signals which are susceptible to the processes of synchronous detection at phases which are related to a reference phase, said color-difference signals including $R—Y$, $B—Y$, and $G—Y$ signals and having prescribed phase relationships with respect to said reference phase, said $G—Y$ signal characterized in that it may be also formed by signal addition of predetermined color-difference signals other than said $R—Y$, and $B—Y$ color-difference signals, and a color synchronizing burst containing reference phase information, a matrix synchronous demodulation circuit comprising in combination, a color synchronizing burst responsive synchronous detection signal source having an output signal at a phase synchronized with respect to a phase prescribed by said color-synchronizing burst, a phase shifting and splitting device coupled to said color synchronizing burst responsive signal source and adapted to produce at least a first synchronous demodulating signal having a phase which lags the phase of said color synchronizing burst by substantially 102.95° and providing a second synchronous demodulating signal having a reference phase which lags the phase of said color synchronizing burst by 166.53°, a first synchronous demodulating circuit and a second synchronous demodulating circuit each including at least an electron control device having at least an anode, a cathode and a control electrode, an anode output circuit, and a control electrode bias-and-driving circuit, means for coupling said chrominance signal between the anode and cathode of each of said first and second synchronous demodulating circuits to provide said chrominance signal at a first amplitude level at the anode of said first synchronous demodulating circuit and at a second prescribed amplitude at the anode of said second synchronous demodulating circuit, means for coupling said first synchronous demodulating signal to the control electrode bias-and-driving circuit of said first synchronous demodulator and means for coupling said second synchronous demodulating signal to the control electrode bias-and-driving circuit of said second synchronous demodulator circuit, a cathode resistor circuit, a fixed potential terminal, means for coupling said cathode resistor circuit between said fixed potential terminal and both of said cathodes of said electron control devices of said first synchronous demodulator and said second synchronous demodulator, the control electrode biasing and driving circuits in said first synchronous demodulator circuit and said second synchronous demodulator circuit having time constants whereby said first electron control device and said second electron control device are caused to function as class C amplifiers and whereby said $G-Y$ signal is produced across said common cathode resistor, said $R-Y$ signal is caused to be produced across the output circuit of said first synchronous demodulator circuit and said $B-Y$ signal is caused to be produced across the output circuit of said synchronous demodulator circuit, a first filter network, a second filter network, and a third filter network, each of said first, second and third filter networks characterized in that they present substantially series resonance in a prescribed range of frequencies related to said chrominance signal, means for coupling said first filter network across said common cathode resistor, means for coupling said second filter network between the output circuit of said first synchronous demodulating circuit and said fixed reference potential and means for coupling said third filter network circuit between the output circuit of said second synchronous demodulator circuit and said fixed reference potential whereby said chrominance signal and said color synchronizing bursts are substantially reduced in amplitude across the output circuits of said first and second synchronous demodulator circuits and said common cathode resistor.

13. In a color television receiver adapted to receive a signal including a color modulated subcarrier, in combination, two synchronous detectors for obtaining selected color information signals corresponding to three phases of said color subcarriers, each of said synchronous detectors comprising a grid controlled electron discharge device, means for causing cyclically electron conduction in each of said grid controlled electron discharge devices at phase different from said three phases, means for impressing said color subcarrier across said two grid controlled electron discharge devices to develop positive and negative polarities of color information signals, coupling means for combining color information signals of one polarity developed by each synchronous detector to provide the first of said selected color information signals, and phasing means for establishing the operating phase of each of said synchronous detectors to produce the desired color information signal.

14. In combination, a source of a phase modulated carrier, a first and second demodulator each including a controllable time varying impedance, means to impress said phase modulated carrier across both of said controllable time varying impedances, means to cyclically vary the impedance of each time varying impedance at a different prescribed frequency and phase, circuit means to derive and combine from each of said first and second demodulators first polarities of a demodulated signal corresponding to each of said different phases and to cause a demodulated signal by one demodulator to drive the other, means to derive a demodulated signal of a second polarity from said first demodulator combined with a demodulated signal of said first polarity coupled from said second demodulator by said circuit means, and means to derive a demodulated signal of a second polarity from said second demodulator combined with a demodulated signal of said first polarity coupled from said first demodulator by said circuit means.

15. In combination, a circuit at which is presented a modulated carrier, a pair of grid controlled electron discharge devices, means to impress said modulated carrier across each of said pair of grid controlled electron discharge devices, means to cause each of said grid controlled electron discharge devices to cyclically present a low impedance to said modulated carrier, circuit means responsive to the cyclic presentation of low impedance of each grid controlled electron discharge device to said modulated carrier to develop a signal combined from demodulated signals of a first polarity corresponding to the timing of said cyclically presented impedance of each electron discharge device, phasing means to establish the operating timing of each grid controlled electron discharge device.

16. In combination, a circuit at which is presented a modulated carrier, a pair of grid controlled electron discharge devices, means to impress said modulated carrier across each of said pair of grid controlled electron discharge devices, means to cause each of said grid controlled electron discharge devices to cyclically present a low impedance to said modulated carrier, circuit means responsive to the cyclic presentation of low impedance of each grid controlled electron discharge device to said modulated carrier to develop a signal combined from demodulated signals of a first polarity corresponding to the timing of said cyclically presented impedance of each electron discharge device, phasing means to establish the operating timing of each grid controlled electron discharge device, means coupled to said first grid controlled electron discharge device to combine a demodulated signal of a second polarity corresponding to the timing of that device and a demodulated signal of said first polarity corresponding to the timing of said second electron discharge device derived from said circuit means, and means coupled to said second grid controlled electron discharge device to combine a demodulated signal of a second polarity corresponding to the timing of that device and a demodulated signal of said first polarity corresponding to the timing of said first electron discharge device derived from said circuit means.

17. In a color television receiver adapted to receive a signal including a color modulated subcarrier, in combination, two synchronous detectors for obtaining selected color information signals corresponding to three phases of said color subcarriers, each of said synchronous detectors comprising means to cyclically develop a low shunt impedance at a phase different from said three phases, means for impressing said color subcarrier across both said low impedance developing means to develop positive and negative polarities of color information signals, coupling means for combining color information signals of one polarity developed by each synchronous detector to provide the first of said selected color information signals, and phasing means for establishing the operating phase of each of said synchronous detectors to produce the desired color information signal.

18. In combination: a first circuit to provide a chrominance signal wherein occur different color difference signals; each of said color difference signals occurring at a different phase of said chrominance signal; a second circuit to develop an alternating current wave having a phase related to the phases of said chrominance signal; an electron tube having a control electrode and a pair of output electrodes comprising a cathode and an anode, means to apply said chrominance signal between said pair of output electrodes; a first load coupled to said anode; a second load coupled to said cathode; means coupled to said second circuit to apply an alternating current wave having a first phase of said chrominance signal between said cathode and said control electrode to cause intermittent flow of current through said electron tube at a timing corresponding to said first phase to thereby develop different polarities of a first color difference signal across said first and second loads, a synchronous demodulator circuit coupled to one of said pair of output electrodes and coupled to said first and second circuits to develop color difference signal information occurring at a second phase of said chrominance signal across at least one of said first and second loads.

19. In a color television receiver, a color demodulation circuit comprising in combination: a first and second synchronous demodulator each having a high potential terminal and operative to demodulate color information responsive to a chrominance signal applied across that synchronous demodulator and to a demodulating signal applied to that synchronous demodulator to provide cyclical varying conduction therein at a phase corresponding to the phase at which that color-difference signal occurs in said chrominance signal, means coupling said first and second demodulator together to provide a common point through which the currents of both said first and second synchronous demodulators flow, means to apply a chrominance signal across each of said first and second synchronous demodulators, means to apply a demodulating signal having a first phase of said chrominance signal to said first synchronous demodulator to cause cyclic conduction in said first synchronous demodulator at said first phase, and to apply a demodulating signal having a second phase of said chrominance signal to said second synchronous demodulator to cause cyclic conduction in said second synchronous demodulator at said second phase; a fixed potential point; a boot strap impedance coupled between said fixed potential point and said common point and comprising a path through which substantially all currents passing through said first and second synchronous demodulators flow and across which demodulated color information developed by both said first and second synchronous demodulators is developed; and potential means coupled between said fixed potential point and the high potential terminals of first and second synchronous demodulators to cause each of said first and second synchronous demodulators and said boot strap impedance to develop a different one of a trio of color-difference signals corresponding to color information occurring at a trio of phases of said chrominance signal different from said first and second phases.

20. In a color television receiver adapted to receive a chrominance signal including modulations comprising different color information signals which occur at different phases of said chrominance signal, each of said color information signals capable of being demodulated by a synchronous detector operative at the phase at which that color information signal occurs in said chrominance signal, the combination of: a first circuit to provide said chrominance signal; a second circuit to provide an alternating current wave having a reference phase related to the phases of said chrominance signal; a first electron tube and a second electron tube each having the plurality of control electrodes including an anode and a cathode and a control grid; means coupled to said first circuit to apply said chrominance signal between the anode and cathode of both of said first and second electron tubes; means coupled to said first circuit to apply an alternating current wave having a first phase of said chrominance signal between said cathode and said control grid of said first electron tube to produce intermittent conduction of current having a timing related to said first phase in said first electron tube thereby developing different polarities of color information occurring at said first phase of said chrominance signal at the anode and cathode of said first electron tube; means coupled to said first circuit to apply an alternating current wave having a second phase of said chrominance signal between said control grid and cathode of said second electron tube to produce intermittent conduction of current having a timing related to said second phase in said second electron tube, thereby producing different polarities of color information occurring at said second phase of said chrominance signal in said second electron tube; means commonly coupled to the cathodes of said first and second electron tubes to form a common path through which current of both said first and second electron tubes flow thereby producing a first color information signal comprising a combination of color information occurring at said first and second phases of said chrominance signal across said common coupling means; and means coupled to the anodes of said first and second electron tubes to derive therefrom different color information signals corresponding to combinations of different polarities of color information occurring at said first and second phases of said chrominance signal.

21. In a color television receiver adapted to receive a chrominance signal including modulations comprising different color information signals which occur at different phases of said chrominance signal, the combination of: a first circuit to provide said chrominance signal; a second circuit to provide alternating current wave having a reference phase related to the phase of said chrominance signal; a first electron tube and a second electron tube each having a control electrode and a pair of output electrodes including an anode and a cathode means coupled to said first circuit to apply said chrominance signal between the output electrodes of said first and second electron tubes, means coupled to said first circuit to apply an alternating current wave having a first phase of said chrominance signal to said cathode and said control grid of said first electron tube to produce intermittent conduction of current having a timing related to said first phase in said first electron tube, means coupled to said first circuit to apply an alternating current wave having a second phase of said chrominance signal to said control grid and cathode of said second electron tube to produce intermittent conduction of current having a timing related to said second phase in said second electron tube; means commonly coupled to one output electrode of said first and second electron tubes to form a common path through which current of both said first and second electron tubes flow and to develop a first color information signal comprising a combination of color information occurring at said first and second phases of said chrominance signal across said common coupling means.

References Cited in the file of this patent

UNITED STATES PATENTS

| | | |
|---|---|---|
| 2,597,886 | McCoy | May 27, 1952 |
| 2,644,030 | Moore | June 30, 1953 |
| 2,680,147 | Rhodes | June 1, 1954 |
| 2,743,310 | Schroeder | Apr. 24, 1956 |
| 2,754,356 | Espenlaub | July 10, 1956 |

OTHER REFERENCES

Two Color Receiver, RCA, November 1949, pages 9, 10.

Introduction to Color Television, Admiral Corp., February 1954, pages 7 to 17.

Color TV, Rider Publications, March 1954, pages 141, 142.